Nov. 30, 1965         C. C. CALDWELL            3,220,702
     FRICTION DRIVES FOR DEVICES SUCH AS SCRAPER HOISTS
                     Filed Feb. 24, 1964
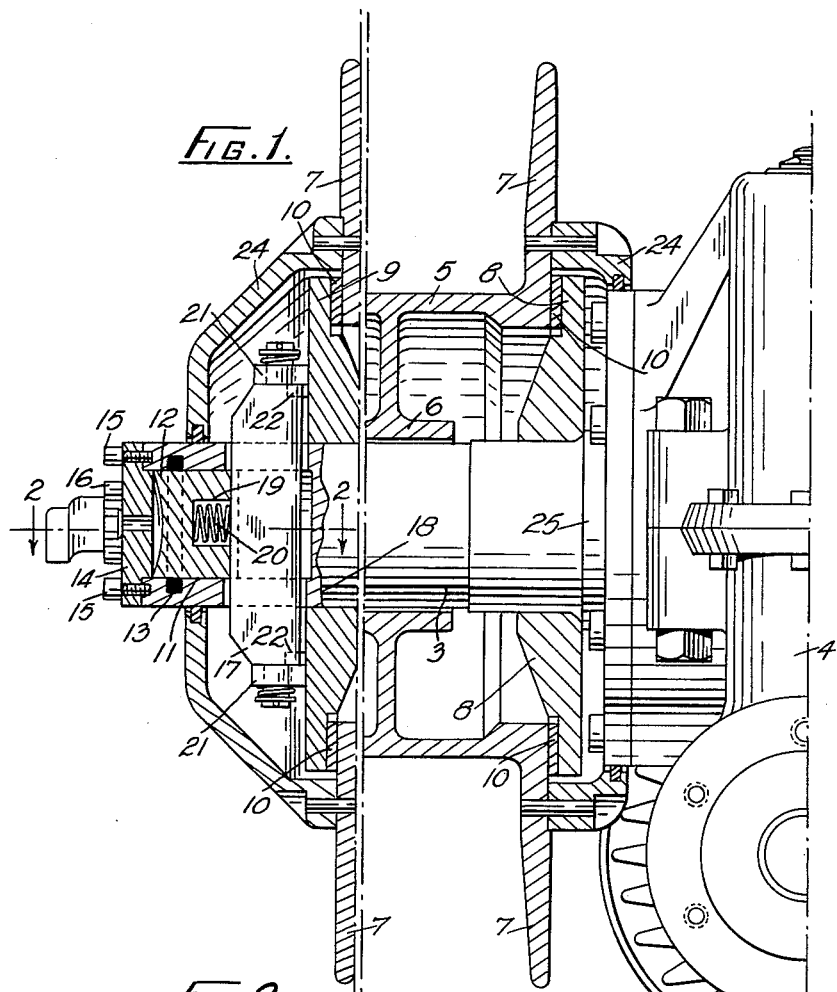
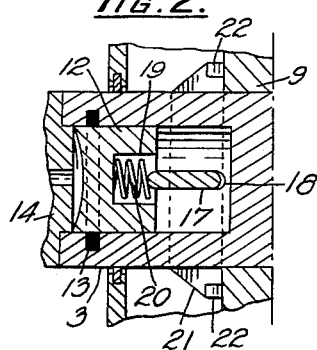
INVENTOR
COLIN CHARLES CALDWELL
By Irwin J. Thompson
                ATTY.

United States Patent Office 3,220,702
Patented Nov. 30, 1965

3,220,702
FRICTION DRIVES FOR DEVICES SUCH AS SCRAPER HOISTS
Colin C. Caldwell, Johannesburg, Transvaal, Republic of South Africa, assignor to David Brown Precision Equipment (Proprietary) Limited, Benoni, Transvaal, Republic of South Africa
Filed Feb. 24, 1964, Ser. No. 346,595
3 Claims. (Cl. 254—187)

This invention relates to friction drives for devices such as scraper hoists.

Conventionally on the South African gold mines scraper hoist drums are rendered operative by means of a band clutch involving levers and the like. There band clutches have been automated to some extent by replacing human power with hydraulic or pneumatic cylinders. A relatively complex mechanism with a plurality of parts that may break or get damaged is involved. Alternatively, a multi-plate clutch operating on the first motion shaft of the gear reducer is used. This also involves levers acting through a considerable distance which require frequent adjustment.

It has also been proposed (although this is not commonly known) in connection with laboratory printing equipment to connect a wheel in driving relationship to a shaft by sandwiching it between two friction discs rotating with the shaft while the wheel is a running fit on the shaft. In the latter construction a thrustor in the form of a spring acting between one disc and the framework of the device provides the sandwiching force. This device is only suitable for small horse powers because of the end thrust exerted on the bearings. In fact the spring is pushing on the shaft in the direction of its length, with its thrust reaction acting on an outside support.

In further proposals (which are also not commonly known) spinning drums for catheads were sandwiched between two friction discs, one of which was acted upon by a foot or hand operated linkage reacting on structure that carries the bearings for the cathead shaft.

An object of the invention is to provide a friction drive that is suitable for work in the horse power range of scraper hoists, which is hydraulically actuated and in which the actuating mechanism takes up the minimum of space.

According to the invention a friction drive for a device such as a scraper hoist is provided in which a winding drum is clamped between two discs concentric with the shaft of the drum, the drum is a free fit on the shaft, one disc, which is a slide fit on and keyed to the shaft, is movable and acted upon by a hydraulic thrustor rotating with the shaft and the other disc is rigidly secured on the shaft in the direction in which the thrustor acts and keyed to the shaft.

Preferably the thrustor cylinder is the construction of the shaft or is a bore in the shaft and the thrustor acts on a transverse member movable in an axially extending slot in the shaft, which member in turn acts on the movable disc. In this case the movable disc may be acted upon by pressure plates pivoted at the ends of the transverse member.

The hydraulic piston may have a semi-cylindrical recess adapted to co-operate with a complemental surface on the transverse member to equalize end pressure.

Further according to the invention the thrustor includes means to exert a predetermined drag on the movable disc. Such means preferably is a compression spring in the thrustor piston that acts on the abovementioned transverse member.

The invention also includes a winch in which the or each drum is driven by a friction drive as described above.

A scraper winch according to the invention includes a gear box, a shaft, the two ends of which extend cantilever fashion from the gear box and which shaft is driven by the gear box, a drum mounted on each of the extending ends, and a friction drive as described above for each drum, the scraper rope being adapted to be wound in directions of the opposite hand on the two drums.

The invention is further discussed with reference to the accompanying drawings, in which FIGURE 1 is a part section through one half of a hoist, and FIGURE 2 is a section on the line 2—2 of FIGURE 1.

In the drawings there is a shaft 3 that extends cantilever fashion from a gear box 4. The details of the gear box are not relevant to the present invention and it is sufficient to say that the shaft extends through the box 4 where the mirror image of the sectioned structure is repeated and that the shaft is driven by the gear box which is in turn driven by a suitable prime mover.

A drum 5 is a free fit on the shaft 3 as can be seen at the exaggerated clearance between the shaft 3 and the central sleeve 6 of the drum 5. The drum 5 has wings 7 which are adjacent discs 8 and 9 which carry rings 10 of suitable friction material.

The disc 8 is a tight fit on the shaft 3 and is held against movement to the right by a shoulder 25 on the shaft and is keyed to the shaft. The disc 9 is a slide fit on but keyed to the shaft 3 and is movable in the direction of the axis of the shaft 3 whilst rotating with the shaft.

The free end of the shaft 3 is bored to provide a cylinder 11. A hydraulic piston 12 is arranged to move in the cylinder 11 and a sealing ring 13 is provided. The cylinder 11 is closed off by means of a cover 14 secured in position by cap screws 15. A rotating valve 16 of a known type feeds pressure fluid through a hole in the cover 14 to the cylinder 11. The rear of the piston is slightly recessed as shown in exaggerated form in the drawing to provide freeboard for the hydraulic fluid.

The front of the piston bears against a transverse key 17 which passes through a slot 18 extending in the axial direction of the shaft 3. As shown in FIGURE 2 the key 17 is rounded where it engages with the piston and the piston has a complemental semi-cylindrical recess 18 at its front end.

The front end of the piston is formed with a bore 19 in which there is a spring 20 that presses on the key 17. The tension in the spring 20 is so chosen that when the clutch is inoperative, a predetermined drag is exerted on the key 17 so that the rope unwinds smoothly from the drum 2.

The ends of the key 17 are turned and pressure plates 21 are pivotally mounted on the turned ends. The key 17 is clear of the disc 9, but the plates 21 press on the disc. This construction assists in the distribution of the pressure on the disc. To prevent the key 17 from moving, stops 22 are provided on the disc 9 at the radially innermost sides of the plates 21 (see FIGURE 2).

Dust shields 23 and 24 with suitable dust seals against the gear box housing and the shaft 3 seals off the discs 8 and 9.

In use the shaft 3 is constantly rotating. When rope has to be wound on to the drum 2, pressure fluid is passed through the valve 16 from any suitable valve arrangement. The pressure fluid acts on the piston 12 which presses on the key 17, which through the pressure plates 21 act on the disc or clutch plate 9. The result is that the drum 5 is clamped between the discs 8 and 9 and thus rotates with the shaft 3. For the return of the rope, the pressure is released and the spring 20 exerts a drag while the drum 2 rotates in the opposite sense under the rope pull.

As said above, the structure is duplicated on the other side of the gear box 4. On such other side the same shaft 3 rotates in the same direction. The rope is, of course, arranged to be wound in a direction of the same hand. Thus by operating a simple four-way hydraulic valve the rope may be wound on to the drum 2 or the other drum (not shown). Scraper action (in the case of a scraper winch) is thus continuously carried on. There is no overrun, no outside means are required to prevent overrun and no adjustments are required to prevent overrun.

The linear force developed is transmitted via the piston directly to friction lined discs which in turn transmit the drum shaft torque directly to the loose winding drums. The action has no apparent movement at all and simply clamps a loose winding drum between two friction discs which are keyed to and rotate with the drum shaft. One disc is free to slide and the other fixed against an abutment shoulder.

I claim:

1. A winch device consisting in a winding drum, a rotatable shaft on which the drum is mounted with a free fit, and two discs concentric with the drum, the drum being adapted to be clamped between the discs, the first disc being a slide fit on the shaft and keyed for rotation with the shaft and the second disc being fixed on the shaft, in which the shaft projects beyond the first disc, a cylindrical bore is formed in the projecting part of the shaft, a piston occupies the cylindrical bore, the wall of the cylindrical bore is formed with two opposed registering slots adjacent to the first disc, a transverse member extends through the slots, the piston acting upon the transverse member and the ends of the transverse member acting upon the first disc, and end closure to the cylindrical bore through which end closure hydraulic fluid is adapted to be fed to the space between the end closure and the piston, and resilient means acting between the transverse member and the piston biasing the first disc to exert a predetermined drag on the drum.

2. The device claimed in claim 1 in which the resilient means is a compression spring housed in a blind bore in the piston.

3. The device claimed in claim 1 in which the transverse member engages with the first disc through pressure plates pivoted on the ends of the transverse member.

References Cited by the Examiner
UNITED STATES PATENTS

| | | |
|---|---|---|
| 1,879,633 | 9/1932 | Olsen. |
| 2,158,250 | 5/1939 | Peters. |
| 2,357,724 | 9/1944 | Beltz. |

SAMUEL F. COLEMAN, *Primary Examiner.*